March 15, 1927.  1,621,307

E. L. BENZEL

GRAIN MIXER

Original Filed Sept. 28, 1923

Inventor:
Emile L. Benzel,
Wm H. Babcock & Son
Att'ys.

Patented Mar. 15, 1927.

1,621,307

UNITED STATES PATENT OFFICE.

EMILE L. BENZEL, OF SHERMAN, TEXAS.

GRAIN MIXER.

Application filed September 28, 1923, Serial No. 665,370. Renewed July 22, 1926.

The present invention relates to feeders for mixers for granular material such as seed, grain, seed and grain mixed, or any granular or pulverulent material.

Heretofore, there has been difficulty in getting a regular or uniform mixture of two or more grains or seeds. This is of particular importance where a mixed feed is required for instance. The same is true, of course, where a mixed seed is required. To grow a uniform crop from it it must be of uniform mixture of course. In previous feeders and mixers the lack of uniformity in the proportions in the mixture has usually been due to the failure to maintain the right proportions between the quantities of the materials taken from the various bins or hoppers and supplied to the mixer or conveyor. In the present invention, these objections are eliminated and the exact proportions are maintained throughout, the several grains, seeds, or other ingredients being thoroughly, continuously, and uniformly mixed by the screw conveyor which, at the same time, mixes and conveys the mixture.

In order to more clearly disclose the construction, operation, and use of the invention, reference should be had to the accompanying drawings, forming part of the present application. Throughout the several figures of the drawings like reference characters designate the same parts.

In the drawings:—

Figure 1:
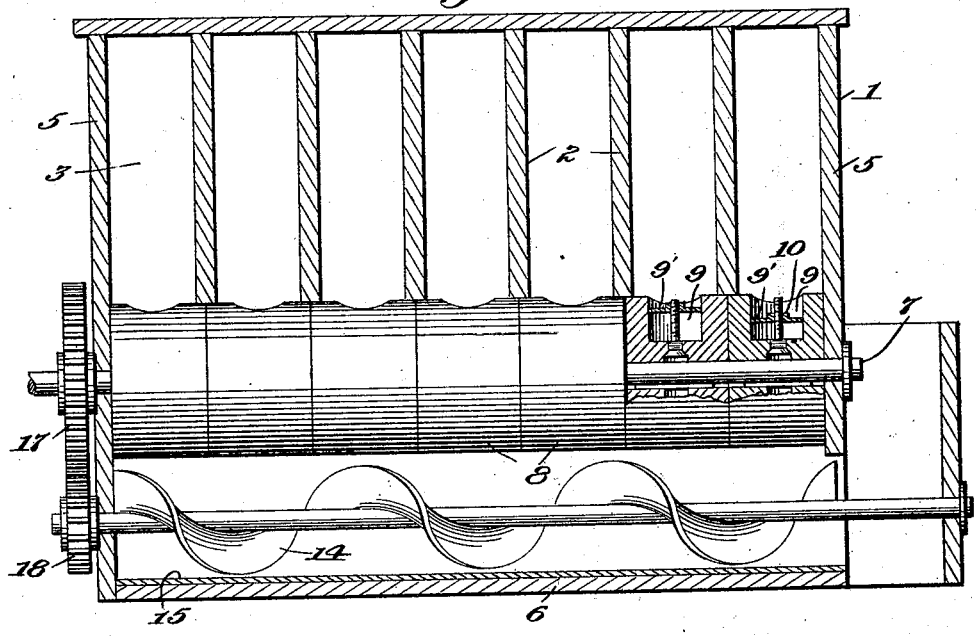
Fig. 1 is a central, vertical, longitudinal cross section through the invention, partly broken away to show several feed pockets in section.
Figure 2:
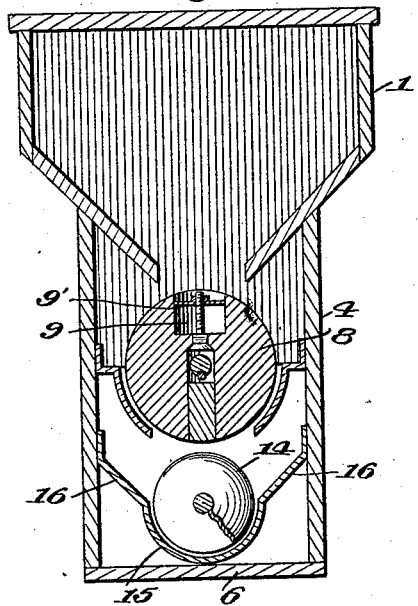
Fig. 2 is a lateral, vertical cross section.
Figure 3:
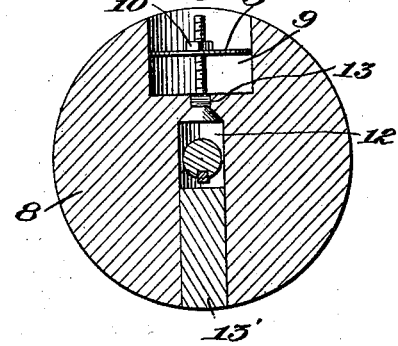
Fig. 3 is a detail, in lateral, vertical cross section, through one of the pockets.

Referring to the drawings in detail, 1 represents a bin or like construction, the upper part of which is divided by partitions 2 into a plurality of vertical hoppers or compartments 3. As shown in the drawings, these hoppers are all of the same size. This, however, is not important. They may be made of the same or different sizes and shapes. However, when of the same size, as here shown, the matter of proportion in the feeding of the material from them, is more readily regulated. It is only the upper part of the bin that is thus divided. The part below the hopper is continuous, from end to end, and completely closed in by the side walls 4, end walls 5, and bottom 6. The bottom of the individual hoppers, on the other hand, slants downwardly and inwardly toward the longitudinal centre of the bin, and an outlet or delivery gap of considerable width is left at the longitudinal centre of the bottom of each hopper and extending the full length of each hopper from partition to partition. Directly beneath these openings and extending the full length of the entire bin is a shaft 7 to which are slidably keyed a plurality of cylindrical sections or blocks 8. These blocks are of such diameter as to extend to within a very short distance of the bottoms of their respective hoppers when the blocks are assembled on their shaft. Each block extends, longitudinally from the centre of one partition to the centre of the next, except in the cases of the end blocks which are slightly shorter because they lie within the end walls. And of course, where the compartments are not of the same widths, the lengths of the blocks will be made to correspond. Each block is provided with a substantially radially disposed feed pocket 9 bored or otherwise formed in it, and adapted to receive grain or other material from one of the compartments 2. But, in order to get the desired mixture and to vary the mixtures to meet different specifications, these pockets must be variable as to volume. To this end, an adjustable false bottom 9′ is provided for each pocket. Preferably, this false bottom is a plate or disc having a collar or thickened central portion 10 bored and threaded to receive a bolt 11. Preferably, also, the collar is shaped as a nut which may be gripped by a suitable wrench so that it may be turned on the bolt and thereby moved toward or from the true bottom of the pocket, to vary the effective depth and volume thereof. Each bolt is, inserted from the opposite side of the block through a bore 12 for that purpose, the bore being suitably closed by a plug 13 after the bolt is placed. The upper end of each bore, where it communicates with the pocket is squared or made of other suitable non-circular shaped cross section to seat a correspondingly shaped portion 13′ on the bolt, to hold the bolt against rotation during rotation of the nut 10, in adjusting the plate 9′, for varying the volume of the pocket.

In the drawings only one pocket has been shown in each block and the blocks have all been shown as of the same size, as above explained, they may vary in size to accord with varying sizes of compartments. For quicker feeding action, each block may be provided with additional pockets similarly disposed. It is not thought necessary to illustrate in the drawings such obvious changes.

From the pockets 9, the grain discharges to a screw conveyor 14 extending parallel with and beneath the shaft 7, and enclosed in a substantially semi-cylindrical trough 15 having upwardly extending steeply inclined side walls 16, leading from its edges to the side walls 4. The conveyor thus receives the grain from all of the pockets and, while feeding it longitudinally toward the usual elevator mechanism thoroughly mixes it. In order to retain the grain in all of the pockets until the desired time of delivery, aprons 12 or similar concaved plates are provided, secured to walls 4 and extending the full length of the machine. These plates are curved to the shape of the assembled blocks and fit close to the surfaces thereof so that there is no chance for the escape of grain from the pockets during rotation, until the pockets are directly over the conveyor.

Preferably, power is applied to shaft 7 for operating the machine, and this is transmitted to the conveyor shaft 14 through gears 17 and 18.

It is clear that the grain or other material finally delivered by the conveyor will be thoroughly mixed and that the mixture will be uniform throughout and in the exact proportions desired. At this point it may be received and elevated or otherwise conveyed to any desired point by any of the well known apparatus regularly used for that purpose.

It is thought that the construction, operation, and use of the invention will be clear from the preceding detailed description, wherein only one preferred form has been disclosed, by way of illustration. Changes may be made in the construction, arrangement and disposition of the several parts of the invention, within the scope of the claims without in any way departing from the field of the invention and it is meant to include all such within this application, wherein only one preferred form has been disclosed, by way of illustration.

Having thus described my invention, what I claim and desire to protect by Letters Patent is:

In combination, in a mixing apparatus, a bin having a plurality of compartments having open bottoms, and composite means for closing said bottoms, said composite means comprising a shaft, and a plurality of duplicate interchangeable cylindrical elements aligned on said shaft, said elements being held in proper relation to each other and to their respective compartments by end engagement with each other, and each said element being provided with a pocket extending from its outer peripheral face and adapted to receive material through the open bottom of its respective compartment.

In testimony whereof, I have signed my name to this specification at Sherman this 25th day of September 1923.

EMILE L. BENZEL.